May 26, 1959 K. F. SCHLICHTING 2,887,715
METHOD OF TRANSPORTING FISH FOR CUTTING
Filed Aug. 8, 1956 3 Sheets-Sheet 2
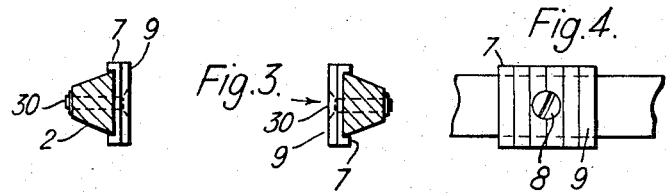
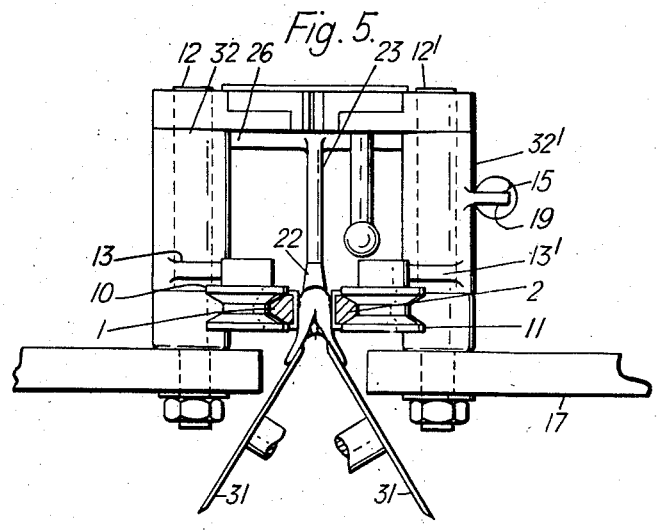
Inventor
K.F. Schlichting
By Richards Geier
Attorneys May 26, 1959    K. F. SCHLICHTING    2,887,715
METHOD OF TRANSPORTING FISH FOR CUTTING
Filed Aug. 8, 1956    3 Sheets-Sheet 3
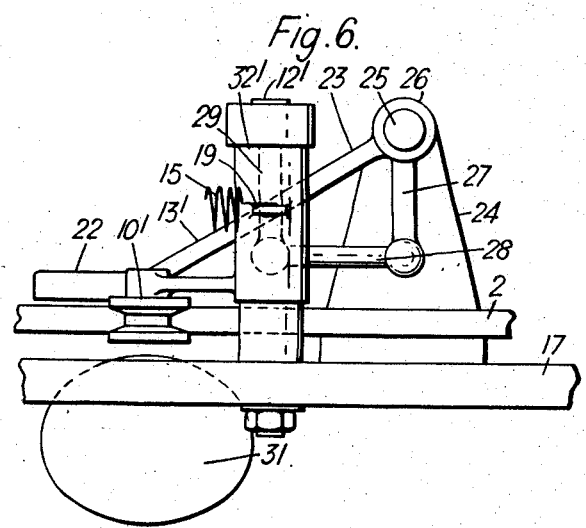
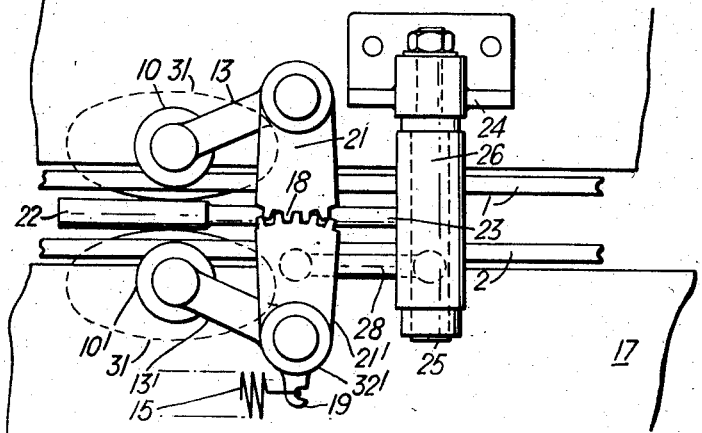
Inventor
K.F. Schlichting
By Richards & Geier
Attorneys

# United States Patent Office 2,887,715
Patented May 26, 1959

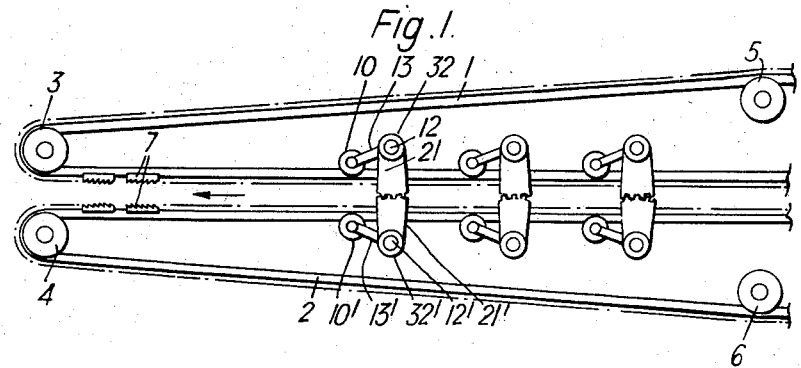
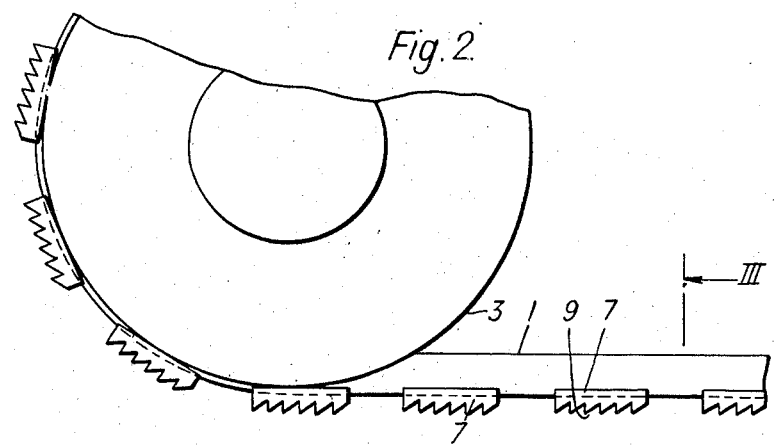
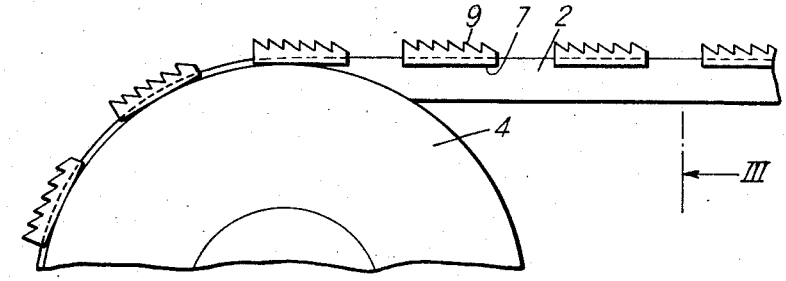

2,887,715
METHOD OF TRANSPORTING FISH FOR CUTTING

Karl Friedrich Schlichting, Lubeck, Germany, assignor to Nordischer Maschinenbau Rud. Baader, Lubeck, Germany Application August 8, 1956, Serial No. 602,718

1 Claim. (Cl. 17—45)

Fish are difficult to dress mechanically because they are soft and easily yield under pressure. They are generally pushed or pulled through the machine, but this often leads to inaccurate cutting or other dressing and to actual damage to the fish.

In an attempt to overcome these drawbacks, the fish have been pushed onto spikes projecting from a conveyor, but these spikes only hold the fish rigidly enough for satisfactorily dressing if they are very close together, and then of course they do considerable damage to the fish. Moreover, once a fish has been pushed onto the spikes, its position can no longer be adjusted for the dressing operation. Now the fish may well arrive in a distorted state, as a result either of freezing or packing, and be pushed onto the spikes while still distorted. It is then impossible for the fish to be properly presented to the dressing tools.

According to the present invention, the fish is carried to a dressing tool by a conveyor having surfaces facing each other between which the fish is gripped, the surfaces being constructed to engage the fish firmly in the direction of travel but to allow it to move easily in transverse direction thereto. Since the fish is merely firmly conveyed before reaching the dressing tool and is free to move transversely to the direction in which it travels, it is possible for any distortion to be corrected and for the fish to be brought by guides into the proper position transversely to the direction of movement to the conveyor.

The conveyor preferably comprises two endless belts or the like having opposed surfaces between which the fish is gripped, and these surfaces may be formed by plates secured to the endless belts or the like at regular intervals apart. Alternatively, the surfaces which grip firmly in the conveying direction while allowing freedom of movement transversely thereto, may be arranged continuously over the entire length of the endless belts or the like.

To produce the desired effect, the opposed surfaces preferably have triangular teeth extending across the width of the surfaces and facing forward in the direction of travel.

To force the two surfaces towards one another while the fish is being dressed, a pair of rollers is preferably used to urge the gripping surfaces together, the rollers being advantageously interconnected to move in synchronism.

A machine according to the invention is hereinafter described by way of example with reference to the accompanying drawings, in which:

Fig. 1 is a diagrammatic plan view of part of the conveyor with pairs of cooperating rollers;

Fig. 2 shows part of Figure 1 on a larger scale;

Fig. 3 is a section on line III—III of Figure 2;

Fig. 4 is a view looking in the direction of the arrow in Figure 3;

Fig. 5 is an end view on a scale intermediate those used in Figures 1 and 2, showing two of the cooperating rollers and the operating means therefor;

Fig. 6 is a side elevation of Figure 5, and

Fig. 7 is a plan view of Figure 5.

The fish dressing machine, part of which is shown in the drawings, is intended to perform a series of dressing operations on the fish. Dressing tools, which are not shown in Figure 1, are arranged in line with one another and the fish is carried to them by a conveyor which comprises two parallel endless belts 1 and 2 running over pulleys 3 and 4 respectively at one end, over similar pulleys at the other end, not shown in the drawings, and over intermediate pulleys 5 and 6. On the vertical outer side of each belt there is a series of metal or plastic plates 7, each secured to the belt by bolts 30. Each plate has triangular teeth 9 extending from top to bottom across the width of the plate and facing the direction of travel of the belts, as shown in Fig. 2.

The dressing tools are disposed along the centre line between the inner runs of the two belts 1 and 2. Figures 5 to 7 show one tool comprising a pair of rotary disc knives 31 rotatable about inclined axes. As the fish is brought to each dressing tool it passes between two rollers 10 and 10'. Each of these rollers is carried by an arm 13, 13' projecting from a sleeve 32, 32' which can pivot on a bolt 12, 12'. These sleeves have each a further arm 21, 21' respectively which terminates in a toothed segment 18 and the segments of the two arms intermesh. A hook 19 projects from the sleeve 32' and is engaged by one end of a tension spring 15, the other end of which is anchored to a point on a fixed frame member 17. The spring 15 thus urges the roller 10' towards the belt 2 and, by reason of the intermeshing of the toothed segments 18, the roller 10 is also caused to move towards the belt 1, in synchronism with the roller 10' and the two rollers 10, 10' always lie at equal distances from the centre line between the two belts 1 and 2. The pressure exerted by the rollers on the belts 1 and 2, and therefore on the fish 30, can be varied by adjusting the tension of the spring 15.

In passing each pair of rollers 10, 10' and the dressing tool coordinated thereto, the teeth 9 impose so much frictional resistance that the fish are unable to slip backwards relatively to the belts 1 and 2, but they can move up and down along the teeth and are in fact so moved by guides of the usual kind, which are not shown on the drawings.

Special support is given to the fish while it is being dressed. This is done by a saddle-shaped shoe 22 which bears against the back of the fish. Because of the variation in size of a fish, this shoe 22 is caused to lie at a height that depends on the thickness of the fish which in turn determines the distance between the rollers 10 and 10'. For this purpose the shoe is carried by an arm 23 projecting from a sleeve 26 which can turn on a fixed pin 25 carried in a support 24. Another arm 27 extends downwards from the sleeve 26 and is connected by a link 28 to another link 29 which is pivotally connected to the arm 21'. Thus the rocking movement of the arm 21' imparts a corresponding rocking movement to the arm 23 carrying the shoe 22. The thicker the fish is, the further the shoe 22 will be moved to the right height to bear against the back of the fish.

Figure 5 shows how the fish is firmly supported on three sides while being cut by the knives 31. It is evident that if the nature of the dressing operation is such as to require the fish to be supported or guided below as well as above, a bottom shoe, likewise connected to the arm 21', may also be provided.

If desired, the gripping surfaces of the belts 1 and 2 may run one above the other in horizontal planes, so that the fish is conveyed through the machine on its side instead of in vertical position.

I claim:

The method which comprises transporting a fish while holding its opposite side surfaces lightly so as to permit the shifting of the fish in a transverse direction, gradually increasing pressure against said side surfaces while applying variable pressure against the back of the fish, and cutting the fish while supporting it on three sides to avoid the development of tensions in the meat of the fish being cut.

References Cited in the file of this patent

UNITED STATES PATENTS

| | | |
|---|---|---|
| 1,911,961 | Melnick | May 30, 1933 |
| 2,466,614 | Rivers | Apr. 5, 1949 |
| 2,518,772 | Grausgruber | Aug. 15, 1950 |
| 2,572,316 | Christiansen | Oct. 23, 1951 |
| 2,734,621 | Mojonnier | Feb. 14, 1956 |
| 2,760,225 | Miller | Aug. 28, 1956 |